3,193,525
POLYURETHANE POLYMERS
Wilhelm Kallert, Cologne-Stammheim, Wolfram Neumann, Leverkusen, Konrad Ellegast, Leichlingen, and Albert Awater, Cologne-Mulheim, Germany, assignors to Farbenfabriken Bayer Aktiengesellschaft, Leverkusen, Germany, a corporation of Germany
No Drawing. Filed Feb. 5, 1963, Ser. No. 256,224
Claims priority, application Germany, Feb. 19, 1962,
F 36,063
16 Claims. (Cl. 260—45.9)

This invention relates to polyurethane polymers and a method of preparing the same. More particularly, it relates to polyurethane polymers stabilized against hydrolytic attack afforded by the addition of carbodiimides without the accompanying processing disadvantages.

It has been heretofore known to add carbodiimides to synthetic plastics containing ester groups to provide protection for such plastics against hydrolytic attacks. Polyurethanes based on polyesters are known to be stabilized against hydrolytic attack by the addition of carbodiimides. The carbodiimides are incorporated into the polyester polyurethane at an appropriate stage in the production thereof. In order to facilitate this addition, it is made when the chemical reaction between the isocyanate groups and the reactive hydrogen atoms has not progressed to such an extent that the incorporation becomes impossible. That is, the carbodiimides are added either to the starting materials or at a time when the reaction mixture is still liquid or at least in the plastic condition.

The addition of the carbodiimides prior to the completion of the polyaddition reaction is disadvantageous for the reason that carbodiimides catalyze the active hydrogen-NCO reaction thus causing the rapid increase in the viscosity of the mixture thereby shortening the processing period of the liquid or plastic reaction mixture. This shortened period of time makes the production of finished articles difficult and sometimes impossible.

It has also been heretofore known to inhibit the isocyanate-active hydrogen-polyaddition reaction by the incorporation therein of acid substances such as, for example, hydrochloric acid, citric acid and the like. This method of slowing down the polyaddition reaction cannot be utilized when carbodiimides are incorporated into the reaction mixture because it nullifies the desired effect of the addition of the carbodiimide, namely, the protection against hydrolytic attack. Therefore, while the processing characteristics are improved by the addition of the acid substances, the properties with regard to stability are simultaneously decreased.

It is therefore an object of this invention to provide polyurethane polymers stabilized against hydrolytic attack. It is another object of this invention to provide an improved method of making polyurethane polymers stabilized against hydrolytic attack. It is still another object of this invention to provide polyurethane polymers having improved processing characteristics. It is a further object of this invention to provide a method of neutralizing the catalytic effect of carbodiimides on the active hydrogen-NCO reaction without altering the stabilizing effect on the resulting polymer.

The foregoing objects and others which will become apparent from the following description are accomplished in accordance with the invention generally speaking by providing polyurethane polymers stabilized against hydrolytic attack by the addition thereto of a carbodiimide and prepared by reacting a polyester with an organic polyisocyanate in the presence of a carbodiimide and an enol or enolizable compound free of carboxylic acid groups. Thus, the invention contemplates the incorporation into a reaction mixture of a polyester and a polyisocyanate, a carbodiimide to improve the hydrolytic resistance of the polyurethane polymer being formed, and an organic compound having hydrogen atoms activated by being bonded to a carbon atom adjacent to a carbonyl carbon atom which compound is free of carboxylic acid groups. By this method, the stabilizing action of the carbodiimide group is preserved, but the aforementioned shortening of the working interval in the liquid or plastic condition is not observed.

The polyurethane plastics are prepared in the customary manner by techniques known in the art such as, for example, the casting method, the millable gum method, the so-called thermoplastic method wherein the reaction is interrupted before a substantial amount of cross-linking occurs, and by the preparation of storage stable intermediates which can be cured by the addition of polyisocyanate, peroxides, formaldehyde, sulfur and the like. Thus, the polyester and polyisocyanate can be initially reacted in the presence of the additives set forth above and subsequently cross-linking agents such as glycol or diamines can be added or the additives can be added in the second step or a two-step procedure used. Further, all of the reactants can be simultaneously reacted. Whatever procedure is used for the preparation of the polyester based polyurethane polymers, the process in accordance with this invention is applicable to stabilize the polymer against hydrolytic attack and still prevent the catalysis of the reaction.

In the preparation of polyurethane polymers in accordance with this invention any suitable polyester may be used such as, for example, the reaction product of polyhydric alcohols with polycarboxylic acids. Any suitable polycarboxylic acid may be used such as, for example, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable polyhydric alcohol may be used such as, for example, ethylene glycol, propylene glycol, 1,4-butanediol, 1,3-butanediol, 1,5-pentanediol, 1,6-hexanediol, bis-(hydroxy methyl chlorohexane), diethylene glycol, 2,2-dimethyl propylene glycol, 1,3,6-hexanetriol, trimethylol propane, pentaerythritol, sorbitol, glycerine and the like.

Of course, other compositions containing polyester resins as a reaction component or in admixture can also be stabilized by the process of this invention. For example, compositions such as polyester amides and polyester urethanes can be stabilized. The reaction product of any of the hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyurethanes. Of course, aminoalcohols and aminoacids can be used in the preparation of polyesteramides.

Any suitable amino compound can be used to prepare polyesteramides such as, for example, hexamethylene diamine, ethylene diamine, propylene diamine, butylene diamine, cyclohexylene diamine, phenylene diamine, toluylene diamine, xylylene diamine, 4,4'-diamino-diphenyl-methane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

Any suitable organic polyisocyanate may be used such as, for example, 2,4- and 2,6-toluylene diisocyanate and isomeric mixtures thereof, 4,4'-diphenylmethane diisocyanate, m-phenylene diisocyanate, 1,5-naphthylene diisocyanate, 4-chloro-1,3-phenylene diisocyanate, tetramethylene diisocyanate, hexamethylene diisocyanate, 1,4-dicyclohexyl diisocyanate, 1,4-cyclohexylene diisocyanate, 2,4,6-toluylene triisocyanate and the like.

As stated previously the isocyanate-polyester reaction mixture or reaction product may be further reacted by the addition of a chain extending agent such as, for example, glycols and diamines and aminoalcohols such as, for example, any of the glycols mentioned above in the preparation of the polyesters and polyesteramides and also phenylene bis(beta-hydroxy ethyl ether), xylylene glycol, hydrazine, water, carbodihydrazide and the like. It is of course to be understood that where the above reactants are present in an amount such that the molecule is terminated by active hydrogen atoms the polymer can be cured by the addition thereto of a further quantity of an organic polyisocyanate or formaldehyde, organic peroxides, sulfur and the like.

In accordance with this invention, any suitable organic compound containing at least one carbodiimide group may be used to extend the life time of polyester urethanes by decreasing the hydrolysis thereof such as, for example, diisopropyl carbodiimide, dicyclohexyl carbodiimide, methyl tertiary butyl carbodiimide, tertiary butyl phenyl carbodiimide, tetramethylene-bis-diisobutyl carbodiimide, N-dimethyl amino propyl tertiary butyl carbodiimide, the monoglycol ether of hydroxyphenyl-tertiary butyl carbodiimides; polycarbodiimides having a molecular weight of at least about 500 and having more than 3 carbodiimide groups in the molecule and prepared by reacting polyisocyanate in the presence of catalysts; aromatic and cycloaliphatic monocarbodiimides substituted in at least the 2 and 2' positions with an alkyl group having from 1 to 18 carbon atoms such as, for example, methyl, ethyl, propyl, isopropyl, butyl, isobutyl, dodecyl, octadecyl, aryl, crotyl, oleyl and the like; aralkyl groups such as, for example, benzyl-β-phenyl ethyl, xylyl and the like; aryl groups such as, for example, phenyl, tolyl, naphthyl and the like; alkoxy groups with alkyl residues having from 1 to 18 carbon atoms such as, methoxy, ethoxy, butoxy and the like; halogen atoms such as chlorine, bromine, fluorine, iodine and the like; nitro groups, carbalkoxy groups such as, carbomethoxy groups, ethoxy and the like and cyano groups. These compounds can be prepared by any of the methods described in U.S. patent applications Serial No. 162,589 and 110,651. Organic compounds containing carbodiimide groups can be prepared from organic isocyanates by heating in the presence of a suitable catalyst. Such methods for preparing carbodiimides are described in U.S. Patents 2,840,589; 2,853,473; 2,853,518; 2,941,966 and 2,941,983.

Any suitable isocyanate can be used to prepare carbodiimide containing compounds in accordance with this invention such as, for example, phenyl isocyanate, tolyl isocyanate, isobutyl isocyanate, isopropyl isocyanate, benzyl isocyanate, 2,4- and 2,6-toluylene diisocyanate, 4,4'-diphenyl methane diisocyanate, 4-chloro-1,3-phenylene diisocyanate, tetramethylene diisocyanate, hexamethylene diisocyanate, 1,4-dicyclohexyl diisocyanate, 1,4-cyclohexyl diisocyanate, 2,4,6-toluylene triisocyanate and the like. Further, carbodiimides prepared by treating disubstituted thioureas with metal oxides may be used in the practice of this invention. Any of the polycarbodiimides described in U.S. patent applications Serial No. 43,987, now U.S. Patent 3,152,162; 618,458; 110,651; and 155,791 and 162,589 may be used to stabilize polyesters in conjunction with the enols or enolizable compounds described below. It is pointed out that the carbodiimide group is the essential part of the molecule which produces the stabilizing effect and that the structure of the remainder of the molecule is secondary as any organic compound which contains a carbodiimide group will operate to stabilize polyesters in accordance with this invention.

Specific examples of carbodiimide containing compounds include 2,2'-dimethyl-diphenyl carbodiimide,
2,2'-diisopropyl-diphenyl carbodiimide,
2-dodecyl-2'-n-propyl-diphenyl carbodiimide,
2,2'-diethoxy-diphenyl carbodiimide,
2-O-dodecyl-2'-O-ethyl-diphenyl carbodiimide,
2,2'-dichloro-diphenyl carbodiimide,
2,2'-ditolyl-diphenyl carbodiimide,
2,2'-dibenzyl-diphenyl carbodiimide,
2,2'-dinitro-diphenyl carbodiimide,
2-ethyl-2'-isopropyl-diphenyl carbodiimide,
2,6,2',6'-tetraethyl-diphenyl carbodiimide,
2,6,2',6'-tetrasecondary-butyl-diphenyl-carbodiimide,
2,6,2',6'-tetraethyl-3,3'-dichloro-diphenyl-carbodiimide,
2,6,2',6'-tetraisopropyl-3,3'-dinitro-diphenyl carbodiimide,
2-ethyl-cyclohexyl-2-isopropyl-phenyl carbodiimide,
2,4,6,2',4',6'-hexaisopropyl-diphenyl carbodiimide,
2,2'-diethyl-dicyclohexyl carbodiimide,
2,6,2',6'-tetraisopropyl-dicyclohexyl carbodiimide,
2,6,2',6'-tetraisopropyl dicyclohexyl carbodiimide,
2,6,2',6'-tetraethyl-dicyclohexyl carbodiimide and
2,2'-dichloro-dicyclohexyl carbodiimide,
2,2'-dicarbethoxy diphenyl carbodiimide,
2,2'-dicyano-diphenyl carbodiimide and the like.

Any suitable enol or enolizable compound containing the groupings

or

in an equilibrium with 20%–95% of the keto form and being free of carboxylic acid groups may be used in accordance with this invention to extend the reaction time for the polyaddition reaction. Thus, any organic compound having hydrogen atoms bonded to a carbon atom which hydrogen atoms are activated because of their position on a carbon atom adjacent to a carbonyl carbon atom and which compounds are free of carboxylic acid groups can be used in accordance with this invention such as, for example, acetylacetone, acetoacetic ester, malonic acid diethylester, 1,2-cyclopentanedione, 1,2-cyclohexanedione, dihydroresorcinol, benzoylacetone, benzoyltrifluoracetone, 1,2-dimesityl-1-propene-1-ol, triacetylmethane, dibenzalacetone, dimethyl-gamma-pyrone and the like.

The quantity of the enol or enolizable compounds added depends on the nature and the quantity of the carbodiimide added and generally is on the order of magnitude of from about 0.1% to about 10% and preferably from about 0.5% to about 3% based on the carbodiimide.

As stated previously the addition of the enol or enolizable compound is preferably effected simultaneously with or at least shortly after the addition of the carbodiimide. Further, the carbodiimide can be premixed with the enol or enolizable compound and the prepared mixture added to the reaction mixture of the polyester and polyisocyanate.

The polymers prepared in accordance with this invention find use in a wide variety of end products. For example, cellular polyurethane plastics can be formed which are useful in the furniture industry as cushions, mattresses, pillows and also, in the building trade for both sound and thermal insulation such as, in curtain wall construction. The polyurethane polymers can also be fabricated into coatings and non-porous elastomeric products such as in the paint and lacquer industries and for the preparation of solid articles such as, ball joints, bushings, fibers, film, artificial leather and the like.

The invention is further illustrated but not limited by the following examples in which parts are by weight unless otherwise specified.

*Example 1*

(a) About 1000 parts of a polyester having an hydroxyl number of 55 and obtained from adipic acid and ethylene glycol by thermal esterification are stirred at about 130° C. with about 180 parts of 1,5-naphthylene diisocyanate. A thinly liquid clear melt is obtained after about 10 minutes into which about 20 parts of 1,4-butanediol are incorporated. The melt is introduced into molds maintained at about 115° C., the mixture remaining thinly liquid for about 4 minutes and then gradually becoming thicker. The melt solidifies after 15 minutes to such a degree that the molded elements can be removed. The molded elements are finally heated at about 110° C., for about 24 hours.

(b) If about 20 parts of tetraethyldimethyl-diphenyl-carbodiimide are added to the polyester before the admixture of the 1,5-naphthylene diisocyanate, a mixture is obtained which is already distinctly more viscous before the addition of the 1,4-butylene glycol and has only an effective life of 1¾ minutes with high viscosity after addition of the 1,4-butylene glycol.

(c) If the procedure under (b) is used, but also about 0.2 part of citric acid are simultaneously added to the polyester, the mixture is of low viscosity, like the mixture described under (a), but has an effective life of 4½ minutes and solidifies in the molds after 22 minutes.

(d) A mixture prepared under the same conditions as the mixtures previously described, from about 1000 parts of polyesters, about 20 parts of tetraethyl-dimethyl-diphenyl-carbodiimide, about 0.2 part of aceto-acetic ester and about 180 parts of 1,5-naphthylene diisocyanate, is still of low viscosity about 10 minutes after the mixing operation, like the mixture referred to under (a), and after adding about 20 parts of 1,4-butanediol, can be introduced for about 4 minutes into molds. It is only after this time period has elapsed that the viscosity gradually increases, similar to the pattern observed under (a). The objects can be removed from the mold after about 15 minutes.

The physical properties of the elastomers obtained according to (a)–(d) are set out in the following table.

| Tensile strength, kg./cm.² | Breaking elongation, percent | Shore-hardness, A | Tensile strength at 70° C. and 95% relative humidity after— | | |
|---|---|---|---|---|---|
| | | | 2 weeks | 4 weeks | 6 weeks |
| (a) 290 | 600 | 80 | 60 | Destroy | |
| (b) 285 | 620 | 79 | 270 | 180 | 90 |
| (c) 260 | 610 | 82 | 100 | 20 | Destroyed. |
| (d) 290 | 615 | 81 | 260 | 175 | 95 |

It is of course to be understood that any of the polyester compositions mentioned above and any of the polyisocyanates or chain extending agents can be used in the preparation of polyurethane polymers in accordance with this invention. Further, any of the carbodiimides, enols or enolizable compounds set forth above can be used throughout the working examples in place of those more particularly as set forth therein.

Although the invention has been described in considerable detail for the purpose of illustration, it is to be understood that variations can be made by those skilled in the art without departing from the spirit of the invention and scope of the claims.

What is claimed is:

1. A process for the preparation of polyurethane polymers which comprises reacting an organic polyisocyanate with a hydroxyl polyester prepared by the process which comprises reacting a polycarboxylic acid with a polyhydric alcohol, said reaction being conducted in the presence of a carbodiimide and an organic compound containing the groupings selected from the class consisting of

and

in an equilibrium with 20%–95% of the keto form, said organic compound being free of carboxylic acid groups.

2. The process of claim 1 wherein said organic compound is dihydroresorcinol.

3. The process of claim 1 wherein said organic compound is malonic ester.

4. The process of claim 1 wherein said organic compound is acetoacetic ester.

5. The process of claim 1 wherein said organic compound is acetyl acetone.

6. The process of claim 1 wherein the carbodiimide is 4,4'-dimethyl-2,6,2',6'-tetraethyl-diphenylcarbodiimide.

7. The process of claim 1 wherein the carbodiimide is 2,2',6,6'-tetraisopropyl-diphenylcarbodiimide.

8. The process of claim 1 wherein said organic compound is 1,2-cyclopentanedione.

9. The process of claim 1 wherein said organic compound is 1,2-cyclohexanedione.

10. The process of claim 1 wherein said organic compound is benzoylacetone.

11. The process of claim 1 wherein said organic compound is benzoyltrifluoracetone.

12. The process of claim 1 wherein said organic compound is 1,2-dimesityl-1-propene-1-ol.

13. The process of claim 1 wherein said organic compound is triacetylmethane.

14. The process of claim 1 wherein said organic compound is dibenzalacetone.

15. The process of claim 1 wherein said organic compound is dimethyl-gamma-pyrone.

16. A process for the preparation of polyurethane polymers which comprises reacting an organic polyisocyanate with a chain extending agent and a hydroxyl polyester prepared by the process which comprises reacting a polycarboxylic acid with a polyhydric alcohol, said reaction being conducted in the presence of a carbodiimide and an organic compound containing the grouping selected from the class consisting of

and

in an equilibrium with 20%–95% of the keto form, said organic compound being free of carboxylic acid groups.

(References on following page)

References Cited by the Examiner

UNITED STATES PATENTS

| | | | |
|---|---|---|---|
| 2,654,680 | 10/53 | Goppel et al. | 260—79.3 |
| 2,683,729 | 7/54 | Seeger | 260—75 |
| 2,929,801 | 3/60 | Koller | 260—77.5 |

FOREIGN PATENTS

| | | |
|---|---|---|
| 150,416 | 5/51 | Australia. |
| 1,005,726 | 4/57 | Germany. |
| 876,451 | 8/61 | Great Britain. |

OTHER REFERENCES

Khorana: Chemical Reviews, 1953, vol. 53, page 160.
Saunders et al.: Chemical Reviews, 1948, vol. 43, page 209.

LEON J. BERCOVITZ, *Primary Examiner.*